US011831606B2

(12) United States Patent
Reyes et al.

(10) Patent No.: US 11,831,606 B2
(45) Date of Patent: Nov. 28, 2023

(54) DYNAMICALLY MANAGING FIREWALL PORTS OF AN ENTERPRISE NETWORK

(71) Applicant: KYNDRYL, INC., New York, NY (US)

(72) Inventors: Joseph Reyes, Pelham, NY (US); Hamza Yaswi, Sterling, VA (US); Venkidupathy Ramasamy, Dubai (AE)

(73) Assignee: KYNDRYL, INC., New York, NY (US)

( * ) Notice: Subject to any disclaimer, the term of this patent is extended or adjusted under 35 U.S.C. 154(b) by 683 days.

(21) Appl. No.: 16/862,547

(22) Filed: Apr. 29, 2020

(65) Prior Publication Data

US 2021/0344644 A1 Nov. 4, 2021

(51) Int. Cl.
*G06N 20/00* (2019.01)
*H04L 9/40* (2022.01)

(52) U.S. Cl.
CPC ......... *H04L 63/0236* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,772,347 | B1 * | 8/2004 | Xie | H04L 49/9057 713/154 |
| 7,107,612 | B1 * | 9/2006 | Xie | H04L 63/0263 726/13 |
| 7,966,659 | B1 | 6/2011 | Wilkinson et al. | |
| 8,353,021 | B1 | 1/2013 | Satish et al. | |
| 8,621,060 | B2 | 12/2013 | McClure et al. | |
| 9,853,945 | B2 * | 12/2017 | Branca | H04L 63/20 |
| 10,298,619 | B2 | 5/2019 | Nimmagadda et al. | |
| 10,412,074 | B2 | 9/2019 | Zhang et al. | |
| 10,412,106 | B2 | 9/2019 | Srivastava et al. | |
| 11,218,498 | B2 * | 1/2022 | Hajimirsadeghi | .. H04L 63/1425 |
| 11,258,761 | B2 * | 2/2022 | Bansal | ............... H04L 63/0263 |
| 11,288,319 | B1 * | 3/2022 | Das | ....... G06F 40/186 |
| 2005/0076084 | A1 * | 4/2005 | Loughmiller | ........ G06Q 10/107 706/20 |

(Continued)

FOREIGN PATENT DOCUMENTS

CN 107689992 A 2/2018
CN 110730178 A 1/2020

OTHER PUBLICATIONS

English Translation of Abstract of CN110730178A, issued Jan. 24, 2020.

(Continued)

*Primary Examiner* — Edan Orgad
*Assistant Examiner* — Emmanuel K Maglo
(74) *Attorney, Agent, or Firm* — Erik Swanson; Andrew M. Calderon; Calderon Safran & Cole P.C

(57) ABSTRACT

An AI firewall engine dynamically manages firewall ports of an enterprise network to increase security. The AI firewall engine may begin with a baseline port profile configuration and then add firewall rules derived from natural language processing and machine learning from vendor recommended port requirements for an application. The AI firewall engine builds a dynamic port profile with rules that are applied to the firewalls. The AI firewall engine may then monitor system changes and dynamically updates the port profile and configurations on the firewalls.

18 Claims, 6 Drawing Sheets

(56) References Cited

U.S. PATENT DOCUMENTS

| | | | | |
|---|---|---|---|---|
| 2007/0106568 A1* | 5/2007 | Asher | ................ | G06Q 30/0635 |
| | | | | 705/26.81 |
| 2008/0148380 A1* | 6/2008 | Abzarian | ............ | H04L 63/0263 |
| | | | | 713/153 |
| 2012/0174184 A1 | 7/2012 | Hyndman et al. | | |
| 2012/0275459 A1* | 11/2012 | Ferguson | ................ | H04L 69/22 |
| | | | | 370/392 |
| 2013/0074066 A1* | 3/2013 | Sanzgiri | ................ | H04L 49/70 |
| | | | | 718/1 |
| 2013/0194963 A1* | 8/2013 | Hampel | ................ | H04L 45/24 |
| | | | | 370/254 |
| 2015/0160961 A1* | 6/2015 | Johnson | ............. | H04L 63/0272 |
| | | | | 718/1 |
| 2016/0112374 A1* | 4/2016 | Branca | ................ | H04L 63/102 |
| | | | | 726/1 |
| 2017/0237661 A1* | 8/2017 | Ferguson | ................ | H04L 69/22 |
| | | | | 370/392 |
| 2019/0036956 A1* | 1/2019 | Gunda | ................ | H04L 41/046 |
| 2019/0089725 A1* | 3/2019 | Anachi | ................ | G06N 20/00 |
| 2019/0104136 A1 | 4/2019 | Doctor et al. | | |
| 2019/0173736 A1* | 6/2019 | Ponnuswamy | ....... | H04L 41/145 |
| 2019/0258953 A1* | 8/2019 | Lang | .................... | G06N 3/0454 |
| 2019/0312842 A1 | 10/2019 | Klaghofer et al. | | |
| 2019/0361693 A1 | 11/2019 | Garvey et al. | | |
| 2020/0014662 A1* | 1/2020 | Chanda | ............... | H04L 41/5041 |
| 2021/0344644 A1* | 11/2021 | Reyes | .................... | H04L 63/20 |

OTHER PUBLICATIONS

English Translation of Abstract of CN107689992A, issued Feb. 13, 2018.

Wing et al., "Port Control Protocol (PCP) (RFC6887)", IPCOM000226990D, Apr. 1, 2013.

Modi et al., "A survey of intrusion detection techniques in Cloud", Journal of Network and Computer Applications 36, p. 42-57, 2013.

* cited by examiner

Port Profile Database 125

Port Profile 210

| Communication | Dir | Source | Distination | Ports | Type | Purpose/Comments |
|---|---|---|---|---|---|---|
| AppA > AppB | Uni | Internal Desktops | 10.10.10.66 10.10.10.52 | 22,443 | TCP | Modified for Version 3.0 of App B |
| AppC > AppD | Uni | 192.168.1.1 | 10.10.10.11 | 3306 | TCP | |
| AppB > AppA | Uni | 192.168.1.2 | 10.10.10.14 | Uni | UDP | |
| AppE > AppF | Omni | 192.168.1.3 | 10.10.10.12 | 443,902,22 | Both | Vendor Design Requirements |

Columns: 312, 314, 316, 318, 320, 322, 324

Historical Port Profile Data 212

FIG. 3

DYNAMICALLY MANAGING FIREWALL PORTS OF AN ENTERPRISE NETWORK

BACKGROUND

1. Technical Field

This disclosure generally relates to computer processing, and more specifically relates to a system and method for an firewall engine that uses artificial intelligence (AI) techniques, Machine Learning (ML) and Natural Language Processing (NLP) to dynamically manage firewall ports of an enterprise network.

2. Background Art

An enterprise network or corporate network is an organization's digital communications backbone that connects computers and related devices across departments, workgroup networks, and geographies. An enterprise network may include local and wide area networks (LAN/WAN). An enterprise network may have multiple firewalls at different levels in the network and managed by different teams. Applications communicate over multiple segments of the enterprise network using source and destination IP addresses and associated communication ports.

System and network administrators manage firewall communication ports for applications communicating in large complex enterprise networks based on business security requirements and application communication requirements. Enterprise network environments typically rely on human network security administrators to activate/de-active ports based on inputs such as from change management ticketing systems that allow administrates to submit changes needed for the system. This manual port management may result in ports being left open after applications are decommissioned, or ports not being configured properly across multiple firewalls in the path of communication during onboarding of applications or troubleshooting. As a result, businesses can be exposed to security breaches in their enterprise networks.

BRIEF SUMMARY

An artificial intelligence firewall engine dynamically manages firewall ports of an enterprise network to increase security. The AI firewall engine may begin with a baseline port profile configuration and then add firewall rules derived from natural language processing (NLP) and machine learning from vendor recommended port requirements for an application. The AI firewall engine builds a dynamic port profile with rules that are then applied to the firewalls. The AI firewall engine may then monitor system changes and dynamically updates the port profile and configurations on the firewalls.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 3 is block diagram of an example of a port profile database with a port profile used by the AI firewall engine;

DETAILED DESCRIPTION

The disclosure and claims herein relate to a system and method for an AI firewall engine that dynamically manages firewall ports of an enterprise network to increase security. The AI firewall engine may begin with a baseline port profile configuration and then add firewall rules derived from natural language processing (NLP) and machine learning from vendor recommended port, requirements for an application. The AI firewall engine builds a dynamic port profile with rules that are then applied to the firewalls. The AI firewall engine may then monitor system changes and dynamically updates the port profile and configurations on the firewalls.

Figure 1:
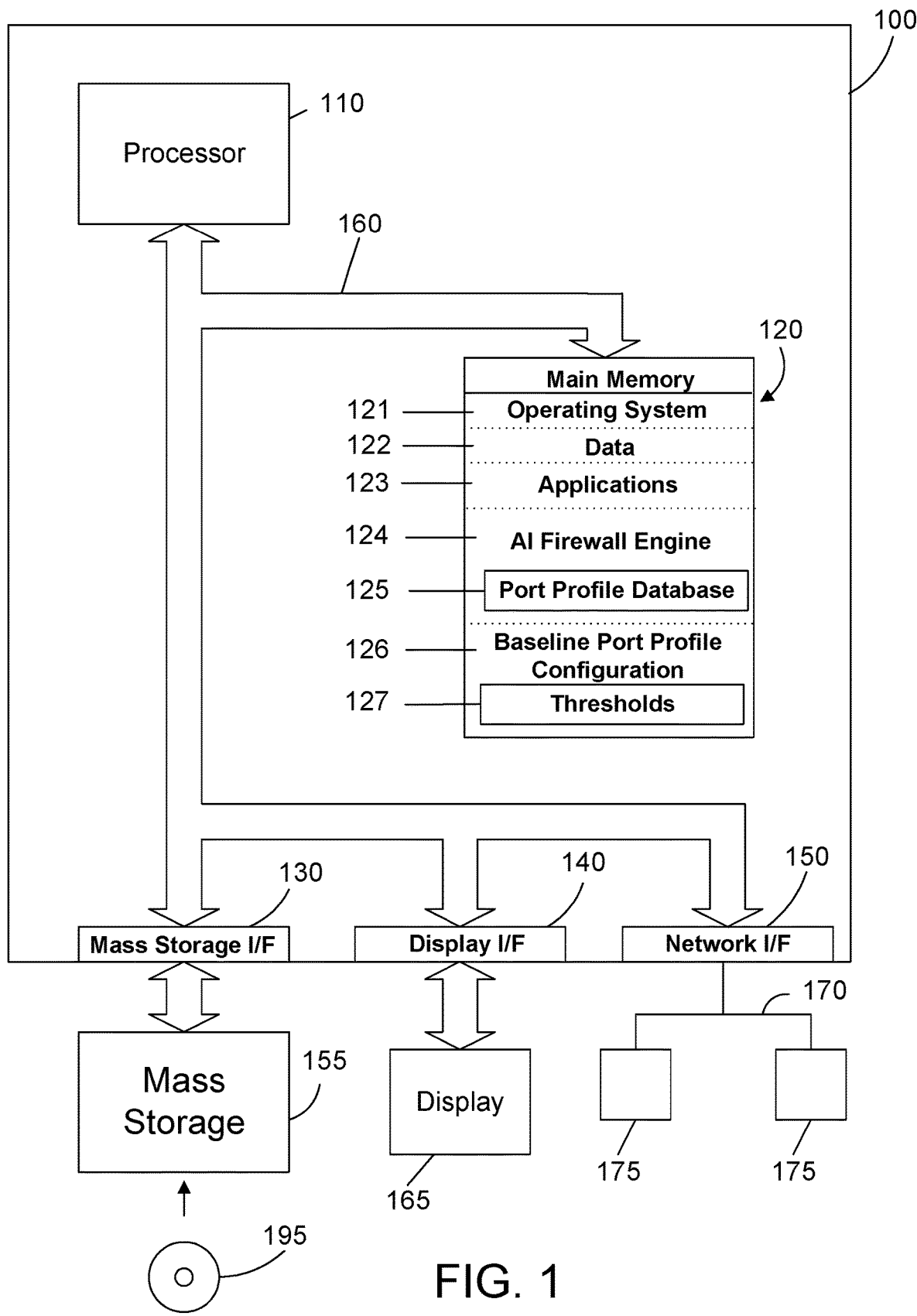
FIG. 1 is a block diagram of a computer system with a AI firewall engine that uses machine learning and natural language processing to manage firewall ports of an enterprise network.

Referring to FIG. 1, a computer system 100 is one suitable implementation of a computer system that is capable of performing the computer operations described herein including a AI firewall engine that dynamically manages firewall ports of an enterprise network to increase security. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and one or more applications 123. The memory 120 also includes an AI firewall engine 124 that includes a port profile database 125. The AI firewall engine 124 incorporates natural language processing (NLP) and machine learning to dynamically manage firewall ports of an enterprise network using the port profile database 125 as described further below. The memory may further include a baseline configuration 126 with thresholds 127, which are used by the AI firewall engine to manage the firewalls as described below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, data 122, applications 123, the dynamic AI firewall engine 124, the port profile database 125, the baseline port profile configuration 126 and the thresholds 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the applications 123 and the AI firewall engine 124.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
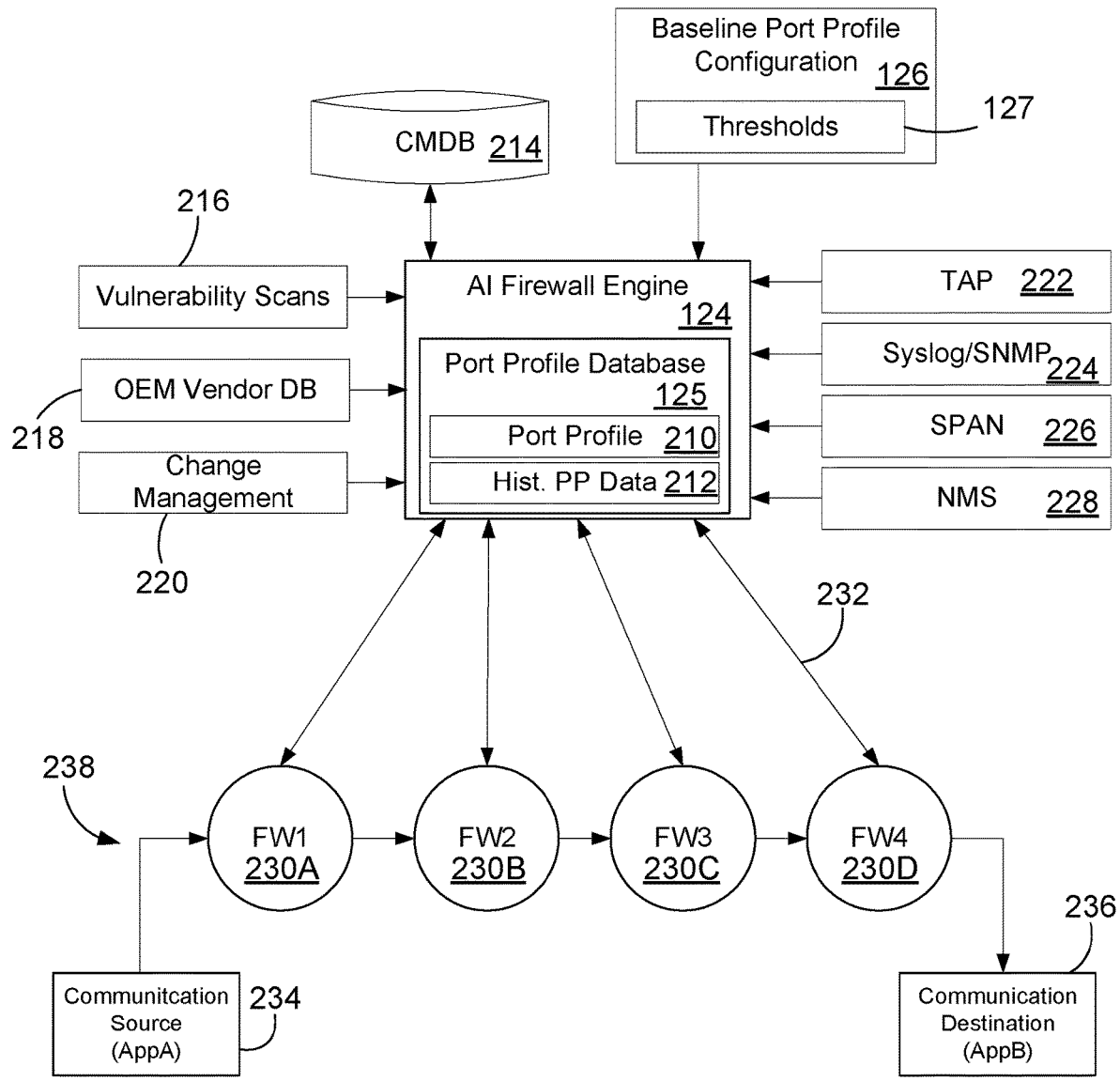
FIG. 2 is block diagram illustrating the AI firewall engine receiving inputs and managing firewalls for communication on an enterprise network.

FIG. 2 illustrates an example of the AI firewall engine 124 receiving inputs and dynamically managing firewalls to facilitate communication on an enterprise network. In this example, the AI firewall engine 124 begins with the baseline port profile configuration 126 with thresholds 127 and then receives or accesses various inputs to create and maintain the port profile 210 and the historical port profile data 212 in the port profile database 125. The AI firewall engine accesses and uses the inputs to determine how the dynamic port profile can be changed to improve security. The inputs may include a change management database (CMDB) 214, vulnerability scans 216, an original equipment manufacturer (OEM) vendor database 218, change management 220, network test access point (TAP) inputs 222, Syslog and simple network management protocol (SNMP) 224, switch point analyzer (SPAN) 226 and network monitoring software (NMS) 228. These inputs to the AI firewall engine are described further below.

In the example illustrated in FIG. 2, there are four firewalls 230A, 230B, 230C, and 230D, collectively referred to as firewalls 230. In an actual enterprise network there may be many more or fewer firewalls. The AI firewall engine 124 applies the port profile 210 to firewalls 230 in the enterprise network to manage communication traffic for a number of applications communicating in the enterprise network. Each application may include a large number of communications to and from many different entities in the network over a variety of paths with firewalls along each path where each communication comprises a communication source and a communication destination. FIG. 2 represents an example of an application communication where application AppA is the communication source 234 and application AppB is the communication destination 236. The communication source 234 communicates 238 with the communication destination 236 thorough the firewalls 230. The firewalls are configured according to the port profile applied to the firewalls by the AI firewall engine as described herein. Other communications included in the port profile may include communications between applications, system services, databases, servers, third party services, etc.

Again referring to FIG. 2, the firewalls 230 may include virtual and physical firewalls. The firewalls may include operating system level firewalls, data center firewalls, boundary firewalls, enterprise firewalls and third party firewalls. The AI firewall engine 124 communicates with the various firewalls to pass port configuration rules in the port profile 210 to the firewalls 230 in the enterprise network to manage communication traffic in the enterprise network. The AI firewall engine communicates with the firewalls 230 over a communication link 232. The communication link may be implemented with industry standard methods as known or developed in the future. These industry methods for communication to the firewalls may include, without limitation, command line, application programing interfaces (APIs) and programmable languages.

FIG. 3 is a block diagram to show an example of a port profile database 125 used by the AI firewall engine 124 described above with reference to in FIGS. 1 and 2. The port profile database 125 includes a port profile 210. The port profile 210 is built and maintained by the AI firewall engine and used to manage the firewalls in the enterprise network systems to increase security of the network. The port profile database 125 may also include historical port profile data 212. The port profile 210 may take the form of a table or any other appropriate data format to contain the port profile data. In this example, there is a single port profile that contains port profile data for an entire enterprise network. Alternatively the port profile could be divided into other arrangements. For example, the port profile could be separated into port profiles for each application or technology being used on the enterprise system. The port profile database 125 may also include historical port profile data 212. The historical port profile data 212 may include past snapshots in time of the port profile 210 that taken together show a history of how and why the port profile was changed.

Again referring to FIG. 3, in this example, the port profile database 125 includes a port profile 210 and historical port profile data 212. The port profile 210 may include rules and/or data similar to that created manually by system administrators when managing firewalls in an enterprise network. The port profile 210 may be represented as a table as shown in FIG. 3 where each row could be considered a port profile rule. In this example, the port profile 210 includes a communication 312, a direction of the communication 314, a source 316, a destination 318, ports for the communication 320, and a communication type 322. The port profile may also include a purpose of the communication or comments about the communication 324. The communication column 312 indicates the communication identification for the other data in the same row of the table shown in FIG. 3.

Again referring to the port profile 210 in FIG. 3, the communications listed in the port profile may include communications between applications, system services, databases, servers, third party services, etc. as discussed above. The direction column 314 indicates a direction for the associated communication. The direction may be unidirectional from the source to the destination or omnidirectional from source to destination and destination to source. Omnidirectional communications are sometimes listed as two unidirectional communications as shown in the first and third rows for communications between AppA and AppB. The source column 316 and the destination column 318 indicate the source IP address and the destination address IP respectively for the associated communication. The ports column 320 indicates which ports the firewall should have open for communications on the associated source and destination IP addresses. The type column 322 indicates the type of communication allowed on the firewall for the associated communication, whether transmission control protocol (TCP) or user datagram protocol (UDP). The port profile 201 may also include a purpose/comments column 324. The purpose/comments column 324 may be used by the AI firewall engine or may be used exclusively for displaying information for a system administrator to understand the purpose of a specific row of the port profile rules.

As discussed above, the AI firewall engine 124 dynamically manages firewall ports of an enterprise network to increase security. In one example, the AI firewall engine 124 is first provided with a baseline port profile configuration 126 to create the port profile. This may be a manual step where system administrators build the baseline port profile configuration 126 in a traditional manner. The baseline port profile configuration 126 may appear similar to the port profile 210 as shown in the example of FIG. 3. As shown in FIG. 2, the baseline port profile configuration 126 may contain one or more thresholds 127. The thresholds 127 may be used in comparisons between data to determine when the AI firewall engine 124 needs to modify the rules or deny traffic to increase security of the enterprise network as described further below.

As described above, the AI fire wall engine 124 uses the baseline port profile configuration 126 to begin using artificial intelligence including natural language processing and machine learning to complete and maintain the port profile 210. The AI firewall engine may first use natural language processing to determine configuration needs to modify the port profile 210. This may include understanding vulnerabilities, system of record, environment changes and vendor best practices to make changes to the port profile 210. Details and some examples of using natural language in for modifying the port profile are discussed below. The AI firewall engine may then inspect system flows using common network monitoring tools and then determine how to build a port profile by modifying the baseline configurations of the port profile. The AI firewall engine may then apply the port profile rules onto the system firewalls over the communication link 232 described above. The AI firewall engine may then continue to monitor the system for changes and dynamically update the port profile. Updating to the port profile 210 may include denying traffic when appropriate to increase network security on the enterprise system.

Using natural language processing to determine configuration needs to modify the port profile may include considering vulnerability scans, management tickets, changes to the CMDB and related OEM vendor documents. For example, vulnerability scans may show a specific port communication that is vulnerable for a known malicious attack. In response, the AI firewall engine may modify the port profile to better withstand such attacks to increase security on the enterprise system.

The AI firewall engine may use also the CMDB 214 shown in FIG. 2 or a change management system 220 to determine how to configure the port profile. The CMDB 214 is record of the system that has the overall enterprise configuration, version and location of the various entities of the enterprise system. Change management 220 is a database or ticketing system that shows what changes need to be made on a specific subset of system. The CMDB 214 and change management 220 may be used by the AI firewall engine to configure the port profile. For example, if the AI firewall engine determines from the CMDB or from management ticketing that an application has been upgraded to a new version, the AI firewall engine may access OEM vender documents and use natural language processing to determine the vendor's recommended ports for communication to/from the new version of the application. The updated port assignments can then applied to the port profile to be used when updating the firewalls.

The AI firewall engine may use one or more network monitoring tools or technologies to monitor and inspect network data flows to determine how to best adjust the port profile. For example, the AI firewall engine may utilize TAP monitoring, Syslog, SNMP, SPAN and NMS to monitor network traffic. While monitoring the network data flows, the AI firewall engine 124 looks for ways to improve system security. Where anomalies in the network data flow are detected, the AI firewall engine 124 may adjust the port profile. For example, if a specific type of traffic is detected over a specified port, where the traffic is known to be harmful, the AI firewall engine can modify the port profile to limit the harmful traffic.

After the AI firewall engine has built and applied the port profile to the firewalls, the AI firewall engine may then continue to monitor the system for changes and dynamically update the port profile. Updating to the port profile may include denying traffic when appropriate to increase network security on the enterprise system. While monitoring and updating the port profile, the AI firewall engine can use each of the inputs and techniques described above. In addition, the AI firewall engine may use pattern analysis to find patterns and long term trends of network traffic to determine how to modify the port profile to increase security. The AI firewall engine can look at daily patterns and seasonal trends to adjust the port profile. For example, if the AI firewall engine monitors network traffic and determines that ports for a communication flow are regularly used only during a short window of time each day, the ports can be closed at other times to increase security. Similarly, if the AI firewall engine monitors network traffic and determines that ports for a communication flow are regularly used only during a specific time of the month, a season, or in relationship to another event, the ports can be closed outside of those times.

The thresholds 127 may be used in comparisons between monitored network data flows to determine when the AI firewall engine 124 needs to modify the rules or deny traffic to increase security of the enterprise network. For example, the AI firewall engine 124 may use network monitoring software (NMS) 228 and other network monitoring tools to get current and expected data rates for a communication path. The AI firewall compares the current and expected data rates with a threshold included in thresholds 127. If the current data rate exceeds the expected data rate by more than the threshold, the AI firewall engine would then take action to increase security. For example, if a threshold was 20% then the AI firewall engine could take action if the current data rate is 20% more than the expected data rate. The action taken to increase security could include shutting down corresponding ports to deny further traffic on the ports for the offending communication.

In another example, after the AI firewall engine has built and applied the port profile to the firewalls, the AI firewall engine may consider load per flow to modify the port profile. For example, if there is no load in a communication flow or open port, the corresponding ports can be shut down. Or if there is an unexpected or dangerous volume of data, the ports can be limited or shut down.

Figure 4:
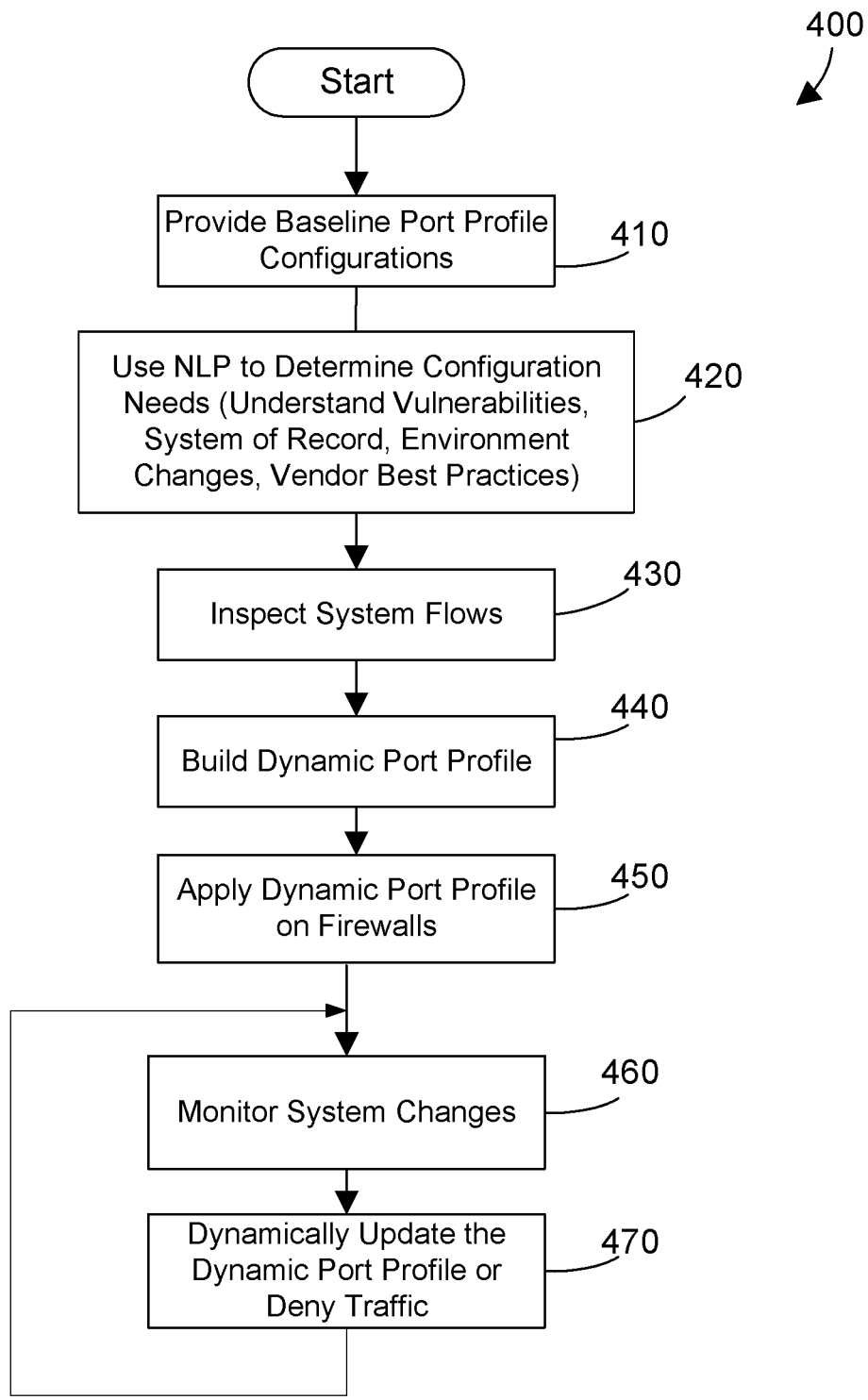
FIG. 4 is a flow diagram of a method for an AI firewall engine to manage firewalls in an enterprise network.

Referring to FIG. 4, a method 400 shows one suitable example for dynamically managing firewall ports of an enterprise network to increase security. Portions of method 400 are preferably performed by the AI firewall engine 124 shown in FIGS. 1 and 2. First, provide baseline port profile configurations to create the port profile (step 410). Next, use natural language processing to determine configuration needs, including understanding vulnerabilities, system of record, environment changes and vendor best practices (step 420). Inspect system flows (step 430). Build dynamic port profile (step 440). Then apply the dynamic profile on the system firewalls (step 450). Monitor system changes 460 and dynamically update the port profile including denying traffic (step 470). Method 400 is then done.

Figure 5:
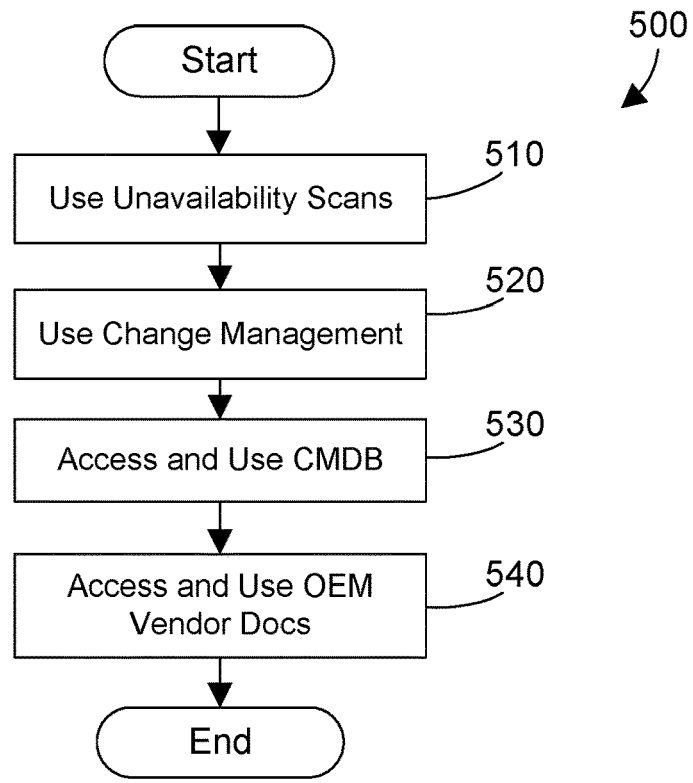
FIG. 5 is a flow diagram of a specific method for step 420 in FIG. 4.

FIG. 5 shows a method 500 for using natural language processing to determine configuration needs. Method 500 thus shows one suitable example of performing step 420 in FIG. 4. Use vulnerability scans to determine how to modify the port profile (step 510). Use change management tickets to determine how to modify the port profile (step 520). Access and use the CMDB to determine how to modify the port profile (step 530). Access and use related OEM vendor documents to modify the port profile (step 540). The method 500 is then done.

Figure 6:
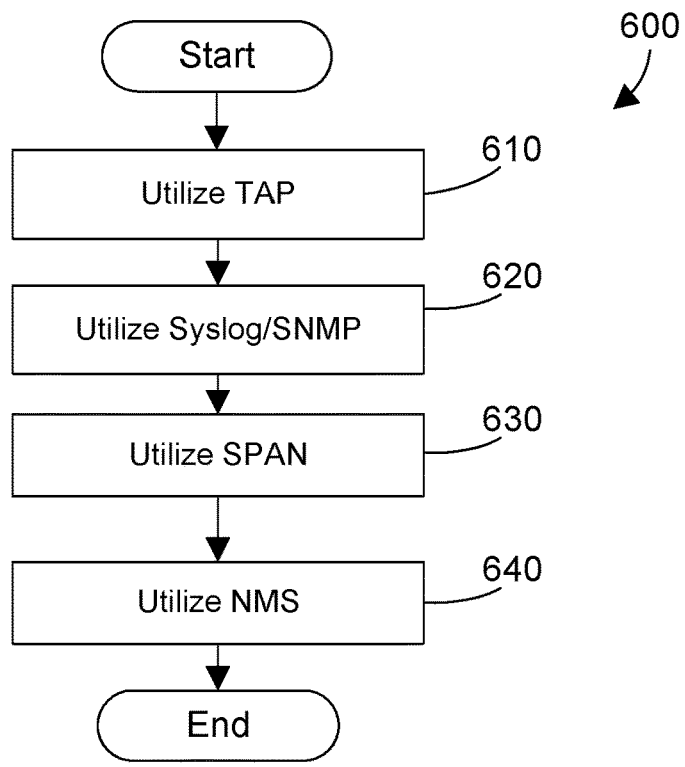
FIG. 6 is a flow diagram of a specific method for step 430 in FIG. 4.

FIG. 6 shows a method 600 for inspecting system flows to adjust the port profile. Method 600 thus shows one suitable example of performing step 430 in FIG. 4. Utilize network tap functions to monitor network traffic (step 610). Utilize network syslog and SNMP functions to monitor network traffic (step 620). Utilize network SPAN functions to monitor network traffic (step 630). Utilize network NMS functions to monitor network traffic (step 640). The method 600 is then done.

Figure 7:
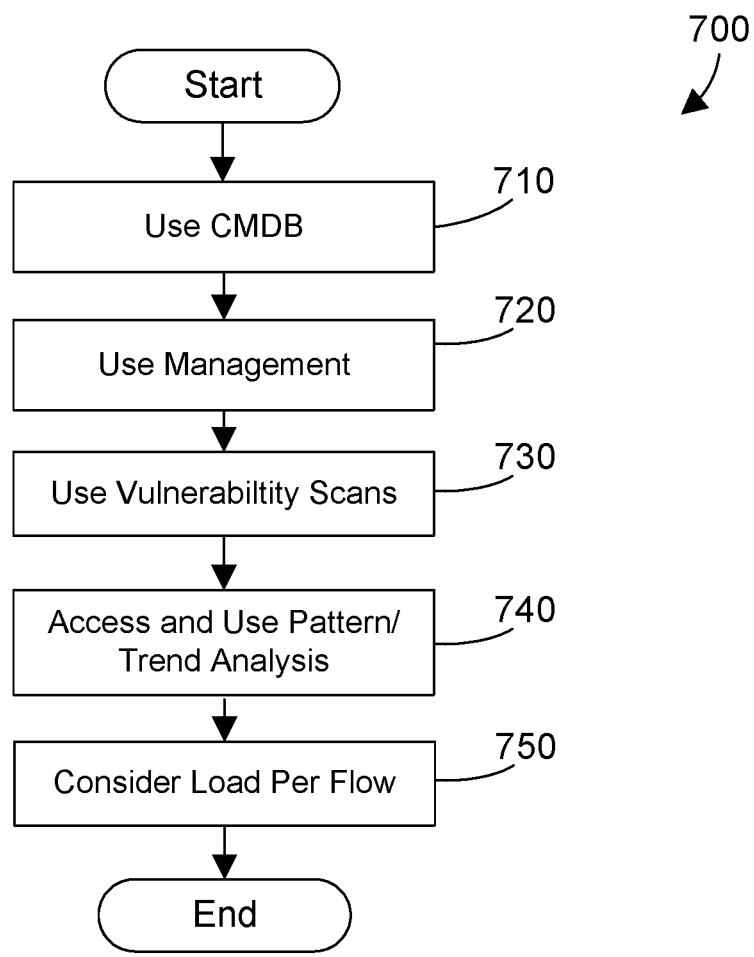
FIG. 7 is a flow diagram of a specific method for step 460 in FIG. 4.

FIG. 7 shows a method 700 for monitoring system changes and dynamically updating the port profile including denying traffic. Method 700 thus shows one suitable example of performing step 460 in FIG. 4. Access and use the CMDB to modify the port profile (step 710). Access and use change management tickets to modify the port profile (step 720). Access and use vulnerability scans to modify the port profile (step 730). Access and use pattern/trend analysis to modify the port profile (step 740). Consider load per flow to modify the port profile (step 750). The method 500 is then done.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, an AI firewall engine dynamically manages firewall ports of an enterprise network to increase security. The AI firewall engine may begin with a baseline configuration and then add firewall rules to build a dynamic port profile that are applied to the firewalls. The AI firewall engine may then monitor system changes and dynamically update the port profile.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a firewall engine residing in the memory and executed by the at least one processor that dynamically manages a plurality of firewalls in an enterprise network system, wherein the firewall engine modifies baseline port profile configurations to build a dynamic port profile and applies the dynamic port profile to the plurality of firewalls in the enterprise network,
   wherein the firewall engine includes a port profile database that includes the dynamic port profile and historic port profile data, and
   wherein the firewall engine uses a network monitoring technology to inspect system data flows to determine how to build the dynamic port profile by modifying the baseline port profile configurations, wherein the system data flows include: terminal access point monitoring; syslog and simple network monitoring protocol, switch point analyzer; and network monitoring software.

2. The apparatus of claim 1 wherein the firewall engine uses natural language processing to consider availability scans, change management, a change management database and vendor documents.

3. The apparatus of claim 1 wherein the firewall engine inspects system data flows to determine what changes to make to the dynamic port profile.

4. The apparatus of claim 1 wherein the firewall engine continues to monitor for system changes and dynamically updates the dynamic port profile including denying traffic.

5. The apparatus of claim 4 wherein the firewall engine continues to monitor for system changes and dynamically updates the dynamic port by using natural language processing to consider availability scans, change management, change management database and vendor documents.

6. The apparatus of claim 4 wherein the firewall engine continues to monitor for system changes and dynamically updates the dynamic port profile using pattern analysis.

7. The apparatus of claim 4 wherein the firewall engine continues to monitor for system changes and dynamically updates the dynamic port by using load per flow.

8. A computer-implemented method executed by at least one processor for dynamically managing a plurality of firewalls in an enterprise network system comprising:
   providing a baseline port profile configuration;
   using machine learning and natural language processing to determine configuration needs;
   inspecting system data flows to determine how to build a dynamic port profile by modifying the baseline port profile configuration;
   building the dynamic port profile; and
   applying the dynamic port profile to the plurality of firewalls in the enterprise network, wherein a firewall engine uses a network monitoring technology to inspect system data flows to determine how to build the dynamic port profile by modifying the baseline port profile configuration, wherein the system data flows include: terminal access point monitoring; syslog and simple network monitoring protocol, switch point analyzer; and network monitoring software.

9. The method of claim 8 wherein using natural language processing includes using availability scans, using change management, using change management database and using vendor documents.

10. The method of claim 8 further comprising continuing to monitor for system changes and dynamically updating the dynamic port profile.

11. The method of claim 10 wherein continuing to monitor for system changes and dynamically updating the dynamic port profile includes using natural language processing to use availability scans, change management, change management database and vendor documents.

12. The method of claim 10 wherein continuing to monitor for system changes and dynamically updating the dynamic port profile includes using pattern analysis.

13. The method of claim 10 wherein continuing to monitor for system changes and dynamically updating the dynamic port profile includes using load per flow.

14. The method of claim 10 wherein continuing to monitor for system changes and dynamically updating the dynamic port profile includes denying traffic.

15. The method of claim 10 wherein continuing to monitor for system changes and dynamically updating the dynamic port profile includes determining when a current data rate exceeds an expected data rate by a threshold provided in a baseline port profile configuration.

16. A computer-implemented method executed by at least one processor for dynamically managing a plurality of firewalls in an enterprise network system comprising:
   providing a baseline port profile configuration;
   using natural language processing to determine configuration needs, including using availability scans, using change management, using change management database and using vendor documents;
   building a dynamic port profile;
   applying the dynamic port profile to the plurality of firewalls in the enterprise network; and
   continuing to monitor for system changes using pattern analysis and dynamically updating the dynamic port profile using pattern and trend analysis,
   wherein the firewall engine includes a port profile database that includes the dynamic port profile and historic port profile data;
   the historic port profile data includes past snapshots in time of the dynamic port profile that taken together show a history of how and why the dynamic port profile was changed; and
   the firewall engine uses a network monitoring technology to inspect system data flows to determine how to build the dynamic port profile by modifying the baseline port profile configuration, wherein the system data flows include: terminal access point monitoring; syslog and simple network monitoring protocol, switch point analyzer; and network monitoring software.

17. The method of claim 16 wherein continuing to monitor for system changes and dynamically updating the dynamic port profile includes using load per flow.

18. The method of claim 16 wherein continuing to monitor for system changes and dynamically updating the dynamic port profile includes denying traffic.

* * * * *